3,198,714
PROCESS FOR MAKING CARBON ARTICLES FROM CARBON PARTICLES AND FURANE DERIVATIVES
William Johnson and William Watt, Farnborough, England, assignors to United Kingdom Atomic Energy Authority, London, England
No Drawing. Filed Nov. 28, 1958, Ser. No. 776,682
Claims priority, application Great Britain, Dec. 5, 1957, 37,892/57
13 Claims. (Cl. 202—26)

This invention relates to a process of manufacturing carbon articles.

It is to be understood that the term "carbon" used herein extends to the various forms of the material, especially graphite.

In the known processes of manufacture of carbon articles coal tar pitch has been commonly employed as a binder with a filler of carbon or coke particles, e.g. pitch coke and petroleum coke, these constituents forming a mixture which is subsequently processed to form solid material and shaped articles.

Although careful control of the quality and properties of the binder and filler has permitted the production of carbon articles having a wide range of physical properties, the process has been relatively expensive because of the difficulty in predicting the effect that the characteristics of a complex material such as pitch will have on the finished article. One characteristic of pitch is that on heating it goes through a liquid stage in which volatiles are given off and on further heating slowly turns to a viscous liquid and then to a highly porous solid, and consequently carbon articles made from pitch tend to suffer from similar porosity. In the particular case of the use of graphite powder as the filler, the carbon articles produced have undesirably soft texture and/or poor mechanical properties. Binders such as sugar have been tried, with little success, in place of the pitch.

The present invention is concerned with the use of a novel binder in place of the aforementioned binders in a process of making carbon articles. According to the invention, a thermosetting liquid binder material consisting essentially of furfuryl alcohol and being polymerizable to yield a thermosetting material is employed as the binder for the particles of carbon with or without other filler material.

Advantageously the binder may be in the form of a mixture of furfuryl alcohol with furfuraldehyde in proportions depending on the desired properties of the article.

Resinification and hardening of the binder prior to a carbonising step may be effected by heat or admixture therewith of a known hardening agent such as small quantities of a mineral acid in accordance with the desired rate of reaction. The proportions of filler and binder may be varied in accordance with the desired nature of the article.

The mixture may comprise a relatively small proportion of binder, say up to 20% by weight. The mixture may be cast, moulded or pressed to form the article with or without heat as required and, following resinification of the binder heat treated in non-oxidising conditions to convert the binder to carbon or graphite by, for example, raising the temperature at a linear rate over a period of 3 days to a temperature in the range 1000–1350° C. A further heat treatment under similar conditions but at a temperature in the range 2000–3000° C. may also be given, if desired.

The viscosity of the mixture will be governed by the choice of manufacturing process.

Thus in the case of moulding, the mixture may be made with a partially resinified liquid binder and allowed to become sufficiently viscous at room temperature for the moulding process, or, if resinification has been effected sufficiently to solidify the mixture, moulding may take place at an elevated temperature high enough to soften the solidified mixture to the required degree (of the order of 80° C.) to render it suitable for moulding.

In the case of casting, the mixture may be prepared with a liquid binder as a slip capable of being poured into a mould and there permitted to set or be resinified.

Several examples according to the invention will now be described.

*Example I*

200 grams of pitch coke of particle size less than 300 B.S.S. mesh and 200 grams of natural graphite of particle size less than 300 B.S.S. mesh were mixed with 100 cc. of furfuryl alcohol aged by refluxing for 48 hours as a binder. 0.4% of concentrated hydrochloric acid was then added and the whole thoroughly mixed with a paddle mixer. Articles, in the form of test discs 1.5 inches diameter and 0.5 inch thick were then made by pressing in a die at 4000 p.s.i. and the binder then resinified by heating at 180° C. for 48 hours. The density of the discs at this stage was about 1.77 gm./cm.$^3$. The discs were then heated to 1000° C. at a linear rate over a period of 3 days to carbonise the binder. After carbonising the density of the discs was about 1.73 gm./cm.$^3$ and permeability from face to face $2 \times 10^{-4}$ cm.$^2$/sec.

*Example II*

600 cc. of natural graphite of particle size less than 300 B.S.S. mesh, 50 cc. of thermal lamp black powder of average particle size 0.08 micron and 250 cc. of a commercial partly polymerised principally furfuryl resin were mixed by stirring for one hour and 0.6 cc. of concentrated hydrochloric acid was then added drop by drop and stirring continued for another 15 minutes. The mix was then thoroughly de-aired and cast into cylindrical blocks 1½ inches in diameter. The blocks were allowed to stand in air at room temperature for 3 days and then heated to cure binder resin by raising the temperature from 40 to 120° C. at a linear rate over a period of 2 days. The blocks were then machined into tubes 2 inches long, 1 inch outside diameter and 0.5 inch inside diameter and carbonised by heating at a linear rate to a temperature of 1000° C. over a 3 day period. The shrinkage in physical dimensions was about 7% and permeability $1 \times 10^{-4}$ cm.$^2$/sec.

In general, moulded or cast articles according to the invention should be subjected to carbonisation treatment by slowly heating them up to above 1000° C. over a period of at least 3 days in non-oxidising conditions.

The invention also includes a combination of, firstly, a process as hereinbefore described with, subsequently, a process as described in co-pending British patent application No. 37,106/57 (U.S. Serial No. 775,121) whereby the impermeability of the articles of the first process is further improved by impregnation with a carbonisation of a liquid impregnant as in the subsequent process.

The invention may be applied to the solution of problems arising in atomic energy power plant, in one instance to the production of substantially impermeable carbon articles, and in another to the production of substantially impermeable fuel elements comprising carbon and a fissionable material such as a metal or carbide, the element being formed by a process according to the invention in which the fissionable material is added in powdered form to the initial carbon and binder mixture.

The processes of the invention have the special advantage that the carbon article end products have greatly improved impermeability compared with the known carbon articles and retain their impermeability even after heating to 2500° C. and cooling. Thus in atomic energy plants, either as a container or as part of a fuel element of fissionable material, they are impermeable to the gaseous products of the fission reaction, in which reaction the carbon acts as a moderator in the known way. The impermeability thus prevents contamination of the coolant, either gas, liquid or liquid metal, and in the latter case prevents ingress of the liquid metal into the pores and the possibility of resulting damage to the carbon structure.

We claim:

1. A process of manufacturing a shaped carbon article having high density and low permeability comprising the steps of forming a mixture of carbon particles and up to about 20% by weight of a liquid binder material consisting essentially of furfuryl alcohol and being polymerizable to yield a thermosetting resinous material, and which gives a high yield of dense relatively low permeability carbon on decomposition by heat, shaping a charge of the mixture to article form, polymerizing the binder material in said shaped article, and then heating said shaped article to carbonize the binder material.

2. A process as claimed in claim 1 in which polymerization is effected by heating the shaped article in air to a temperature not in excess of about 200° C. and for a period of time sufficient to effect resinification of the binder.

3. A process as claimed in claim 2 in which carbonizing is effected by heating the article in non-oxidizing conditions at a linear rate of increase of temperature over a period of about three days to a temperature in the range 1000° C.–1350° C. and thereafter heating the article in non-oxidizing conditions at a temperature in the range 2000° C.–3000° C.

4. A process as claimed in claim 2 in which the charge of mixture is heated during the shaping process to partially polymerize the binder.

5. A process as claimed in claim 2 in which the shaping process is performed when the binder is in a viscous condition.

6. A process as claimed in claim 5 in which the viscous condition of the binder is brought about by heating at the beginning of and during the shaping process.

7. A process as claimed in claim 1 wherein the binder material consists essentially of furfuryl alcohol and an acid polymerization catalyst therefor.

8. A process of manufacturing a shaped carbon article having high density and low permeability comprising the steps of forming a mixture of carbon particles and up to about 20% by weight of a liquid binder material consisting essentially of a mixture of furfuryl alcohol and furfuryl aldehyde, shaping a charge of such mixture to article form, polymerizing the binder in said shaped article, and heating the shaped article to carbonize the binder.

9. A process as claimed in claim 8 in which polymerization is effected by heating the shaped article in air to a temperature not in excess of about 200° C. and for a period of time sufficient to effect a resinification of the binder.

10. A process as claimed in claim 9 in which carbonizing is effected by heating the article in non-oxidizing conditions at a linear rate of increase of temperature over a period of about three days to a temperature in the range 1000° C.–1350° C. and thereafter heating the shaped article in non-oxidizing conditions at a temperature in the range 2000° C.–3000° C.

11. A process as claimed in claim 9 in which the charge of mixture is heated during the shaping operation to partially polymerize the binder.

12. A process as claimed in claim 9 in which the shaping operation is performed when the binder is in a viscous condition.

13. A process as claimed in claim 12 in which the viscous condition of the binder is brought about by heating at the beginning of and during the shaping process.

References Cited by the Examiner

UNITED STATES PATENTS

| 1,729,343 | 9/29 | Haas | 106—56 X |
| 2,270,199 | 1/42 | Thrune | 106—56 X |
| 2,614,947 | 10/52 | Heyroth | 23—209 |
| 2,837,412 | 6/58 | Bennett | 23—209.1 |
| 2,870,031 | 1/59 | Benziger | 23—209.2 |

FOREIGN PATENTS 789,663   1/58   Great Britain.

NORMAN YUDKOFF, *Primary Examiner.*

GEORGE D. MITCHELL, MILTON STERMAN, RICHARD D. NEVIUS, JOSEPH B. SPENCER, *Examiners.*